United States Patent [19]

Wahlstrom

[11] 4,023,167

[45] May 10, 1977

[54] RADIO FREQUENCY DETECTION SYSTEM AND METHOD FOR PASSIVE RESONANCE CIRCUITS

[76] Inventor: Sven E. Wahlstrom, 570 Jackson Drive, Palo Alto, Calif. 94303

[22] Filed: June 16, 1975

[21] Appl. No.: 586,891

[52] U.S. Cl. .................... 343/6.5 SS; 343/17.2 R
[51] Int. Cl.² ........................................ G01S 9/56
[58] Field of Search ................ 343/17.2 R, 6.5 SS

[56] References Cited

UNITED STATES PATENTS

| | | | |
|---|---|---|---|
| 3,353,178 | 11/1967 | Wasterlid | 343/6.5 SS |
| 3,521,280 | 7/1970 | Janco et al. | 343/6.5 SS |
| 3,713,102 | 1/1973 | Martin | 343/6.5 SS X |
| 3,774,205 | 11/1973 | Smith et al. | 343/6.5 SS |
| 3,832,530 | 8/1974 | Reitboeck et al. | 343/6.5 SS X |
| 3,878,528 | 4/1975 | Majeau | 343/6.5 SS |

Primary Examiner—T.H. Tubbesing

[57] ABSTRACT

A system for detecting passive resonant circuits in which bursts of swept radio frequency are transmitted to excite passive resonant circuits. If a circuit is resonant at a particular burst frequency, it is excited, rings and emits a radio frequency signal. Following each transmitted burst, a receiver is turned on to receive energy emitted by a resonant circuit so that if a resonant circuit is excited, its emitted energy is received and the particular resonant circuit identified.

16 Claims, 21 Drawing Figures

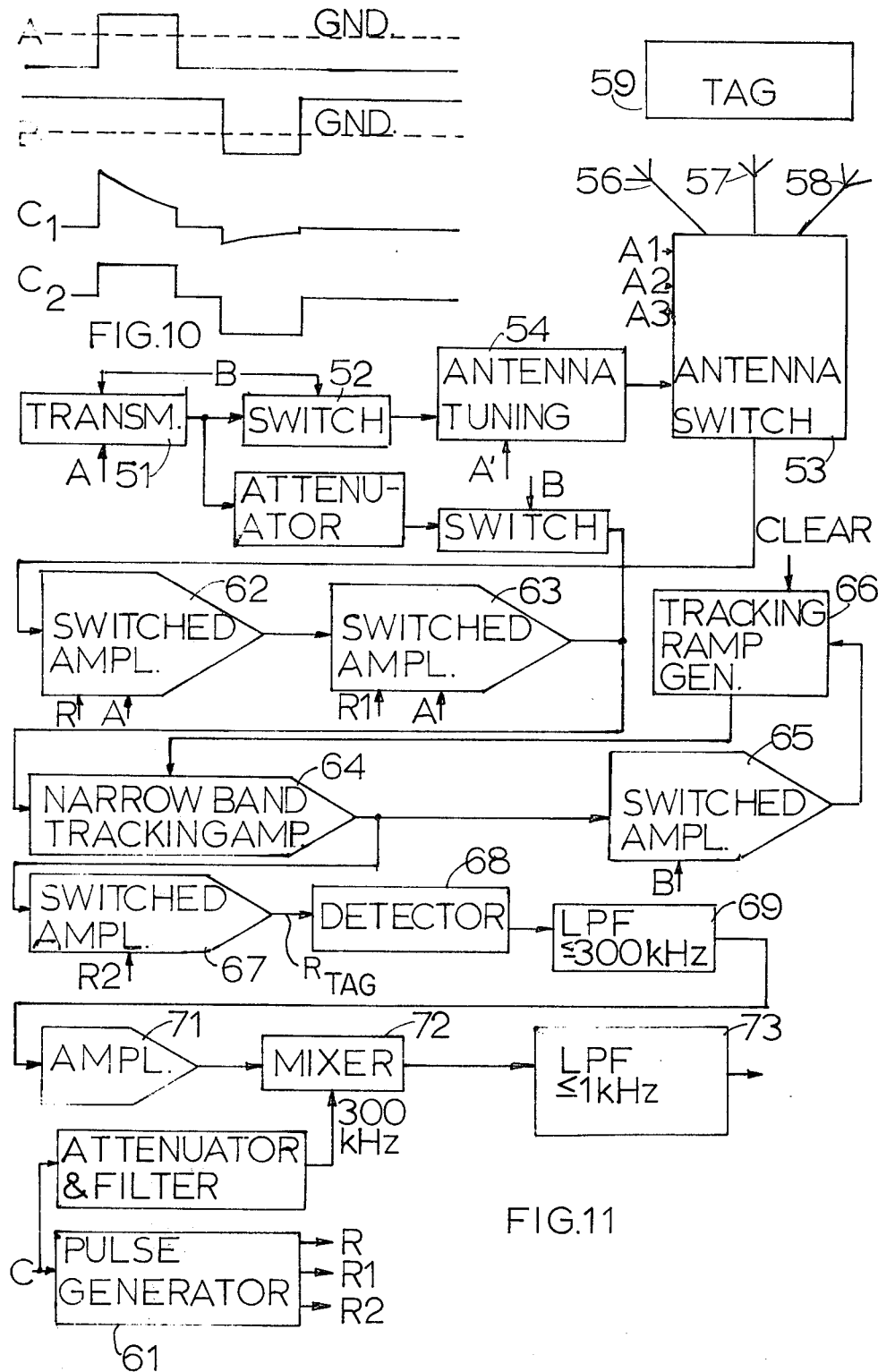

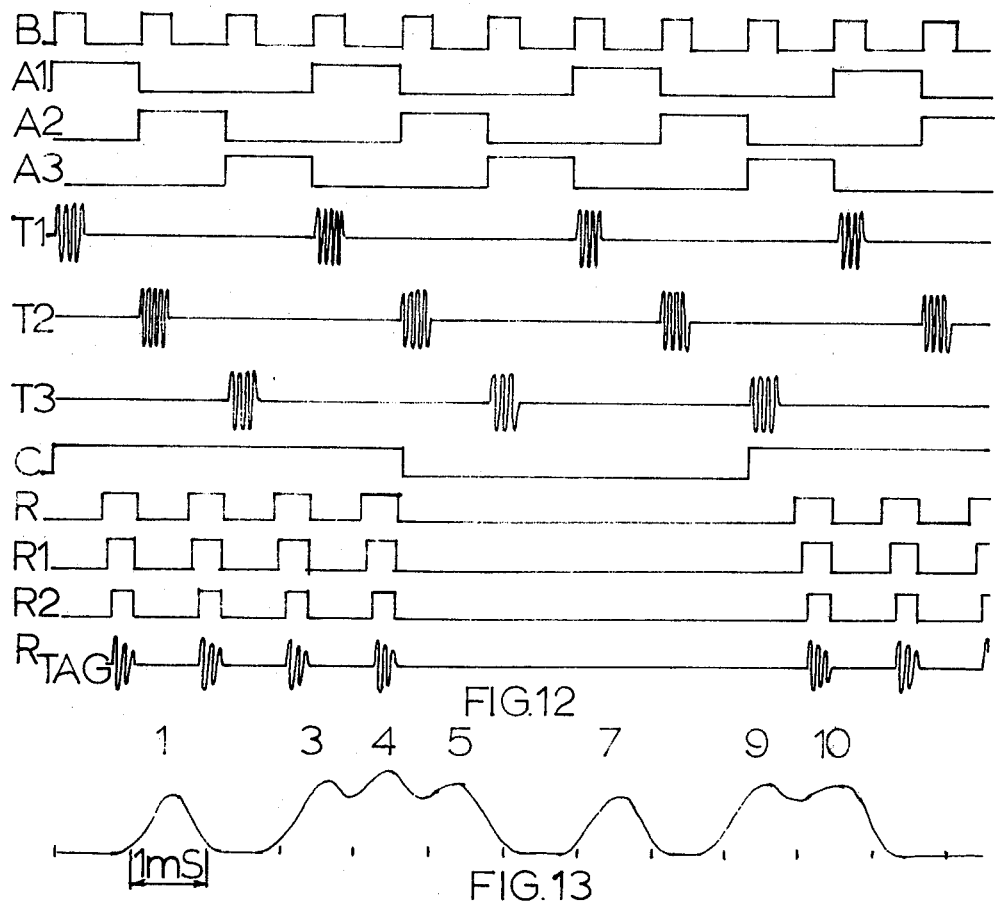
FIG. 12
FIG. 13
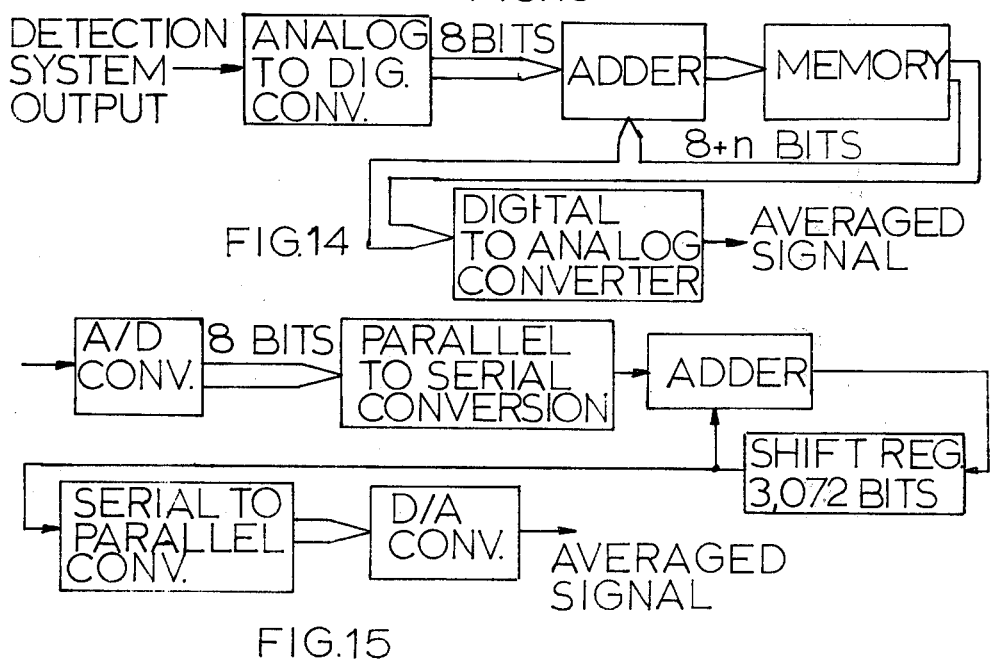
FIG. 14
FIG. 15

RADIO FREQUENCY DETECTION SYSTEM AND METHOD FOR PASSIVE RESONANCE CIRCUITS

BACKGROUND OF THE INVENTION

This invention relates generally to radio frequency systems for identifying passive resonant circuits.

Passive resonant circuits have been placed on goods, excited with swept radio frequency energy and resonant circuits detected to permit identification of the circuits. For example, a plurality of such circuits which respond at different frequencies may be incorporated in labels affixed to goods to provide a code. Such systems may be used in retail establishments to prevent pilferage, at check-out stands to check out goods, and in material handling to route goods such as in warehousing and storage. When such coded labels are placed on goods themselves, they are transported with the goods and permit identification of the goods at various locations as they are shipped in transit, stored or sold.

It is known in the prior art to use coded tags with passive radio frequency resonant circuits in the form of spirals, strips or slots in metal. Principally, two methods have been used for detection of the resonant circuits. One such method employs the principle of the grid dip meter. It is known that when the field of an oscillator is intercepted by a circuit resonating at the oscillator frequency a certain amount of energy is absorbed from the field. This increases the power consumption which in a vacuum tube oscillator shows up as a change in grid current. Multiple resonant circuits have been detected by shifting the oscillator frequency step by step or by sweeping the frequency to cover all potential resonant frequencies of the circuits associated on the coded tag.

Another method which is an extension of the grid dip method uses one transmitter which serves to transmit the radio frequency energy with increasing frequency, either step-wise or swept, and a separate receiver for receiving the energy. The receiver is arranged to detect changes in the intensity of the received swept signal from the transmitter indicating that a passive resonant circuit has absorbed transmitted energy at a particular frequency. Such circuits have also been used which detect the change in phase of the received signal. The signal is generally detected in an environment of very high signal caused by clutter and the direct transmission, and consequently the circuits must be able to detect a weak signal in the presence of high "noise" signals. Each of the above methods is highly limited in range for a given size resonant circuit.

There is need for a radio frequency resonant circuit detection system which can discriminate against clutter or reflected radio frequency energy and against direct transmitted energy to provide signals when an associated resonant circuit is excited.

OBJECTS AND SUMMARY OF THE INVENTION

It is a general object of the present invention to provide an improved radio frequency detection system and method for detecting passive resonant circuits.

It is another object of the present invention to provide a radio frequency detection system and method for detecting passive resonant circuits which is relatively immune to direct transmission, clutter and reflected energy.

It is a further object of the present invention to provide a system of the foregoing character which is inexpensive, simple in construction and reliable in operation.

The foregoing and other objects of the invention are achieved by a system in which the weak signals from the associated resonant circuits are received only when the transmitter has been turned off for a predetermined time allowing the background scatter and direct energy to diminish to very low levels. The transmitted energy is transmitted in pulses or bursts of swept radio frequency. The frequency is swept from below the resonant frequency of the lowest to resonate of the resonant circuits to above the frequency of resonance of the highest to resonate of the resonant circuits. The emitted energy from resonating circuits is detected after termination of each transmitted pulse or burst.

BRIEF DESCRIPTION OF THE DRAWINGS

FIG. 10 is the timing diagram useful in understanding operation of the detector of FIG. 9.

FIG. 11 is a block diagram of a more sophisticated system in accordance with the invention.

FIG. 12 is a timing diagram useful in understanding operation of the system shown in FIG. 11.

FIG. 13 shows a typical output for the system of FIG. 11.

FIG. 14 shows an autocorrelation circuit which can be used in connection with systems of the type described.

FIG. 15 is a schematic diagram of another autocorrelation circuit.

DESCRIPTION OF PREFERRED EMBODIMENTS

Figure 1:
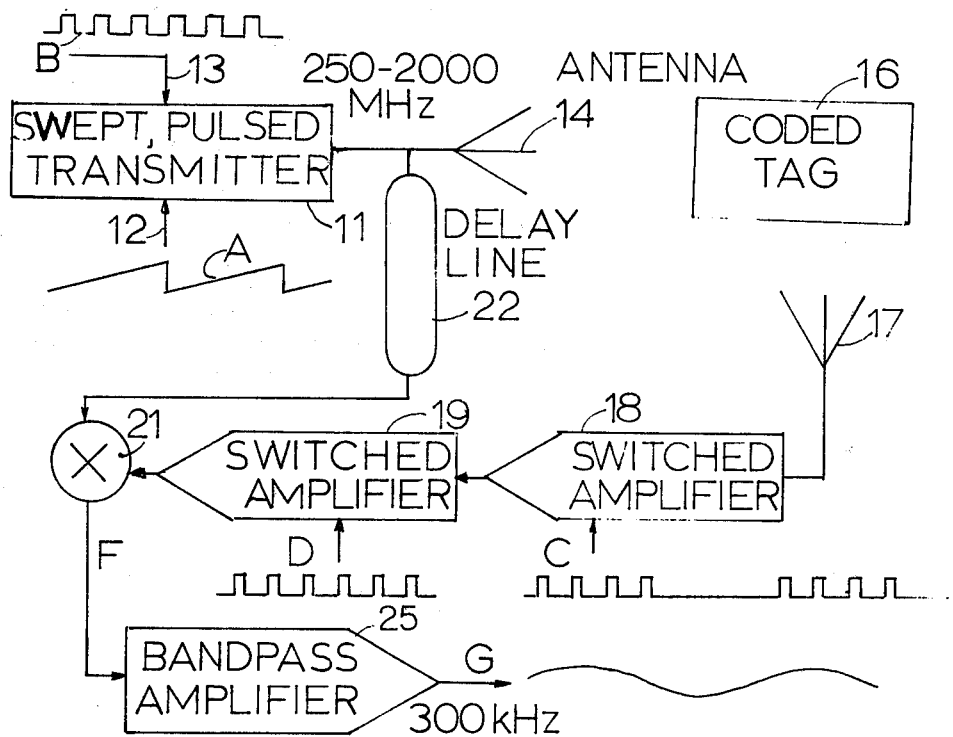
FIG. 1 is a block diagram showing a system in accordance with one embodiment of the present invention.

Referring to FIG. 1, a radio frequency transmitter 11 is caused to periodically sweep its frequency by a low frequency sweep control signal A applied at the input 12. The transmitter is responsive to pulses B applied to the input 13 to transmit bursts of radio frequency to antenna 14. The transmitter may be of the pulse controlled type or it may comprise a swept oscillator followed by an electronic switch or gate. By way of example, the transmitter may be swept from 250 to 2000

MH responsive to the sweep signal A. Consequently, the radio frequency bursts are likewise swept in frequency. The antenna 14 radiates an associated coded tag 16 with the radio frequency bursts. The tag includes one or more circuits adapted to resonate at different frequencies and selected whereby to provide a tag code.

A receiving antenna 17 is located to receive energy emitted by the tag circuits which resonate. The antenna 17 also receives direct signals transmitted by the antenna 14. The output of the receiving antenna is applied to a switched amplifier 18 which is controlled by pulses C. The output of amplifier 18 is applied to another switched amplifier 19 controlled by pulses D. The output of switched amplifier 19 is applied to a mixer 21 having another input from delay line 22 connected to receive transmitted signal and delay its application to the mixer. The switched amplifiers shown may be passive switches followed by amplifiers rather than switched amplifiers. The output of the mixer is applied to a bandpass amplifier 25 and provides an output signal G.

Figure 2:
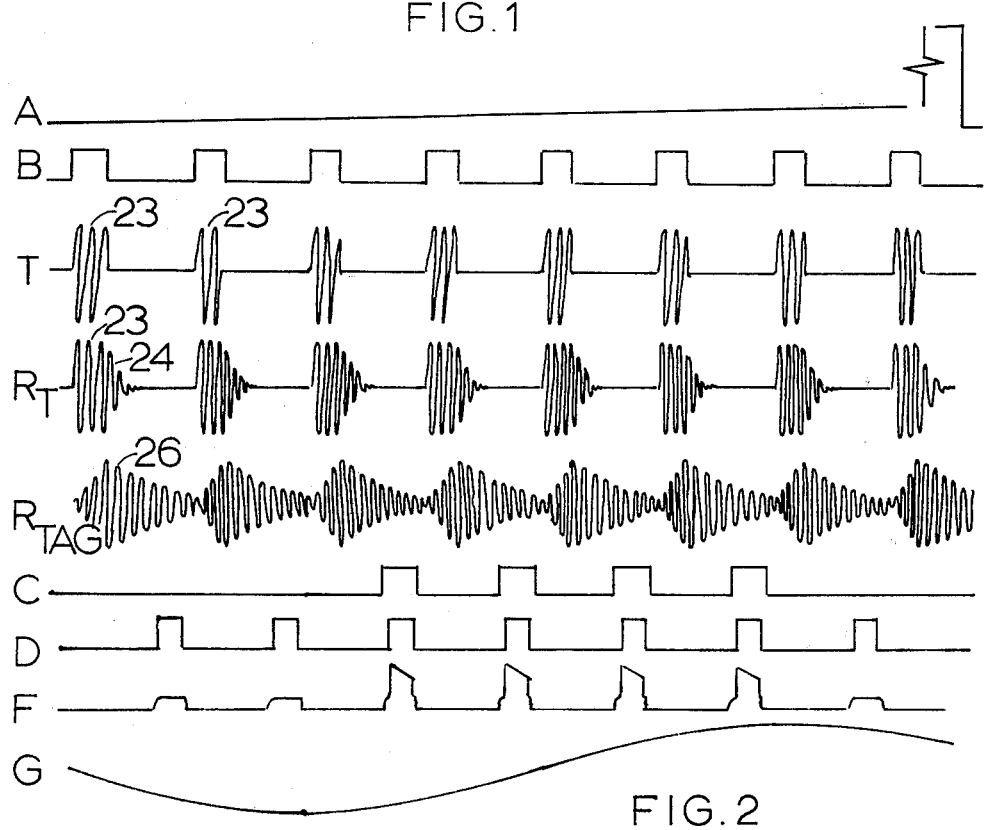
FIG. 2 is a timing diagram useful in understanding the operation of the system of FIG. 1.
Figure 3:
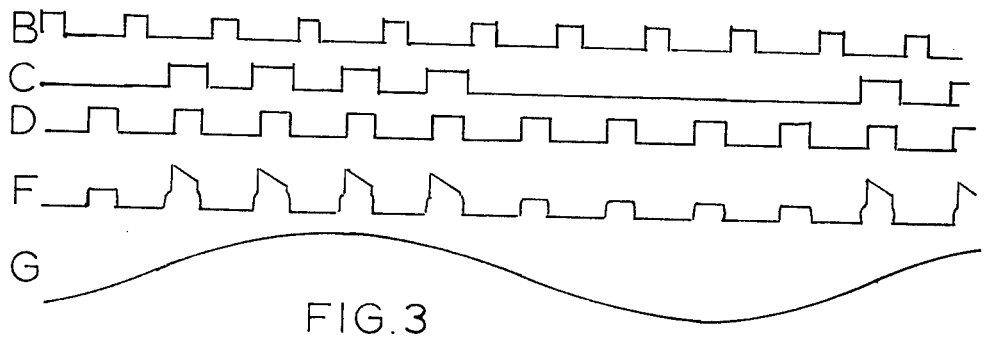
FIG. 3 is a timing diagram showing a plurality of cycles of certain of the signals shown in FIG. 2.

Operation of the circuit of FIG. 1 is explained with reference to FIGS. 2 and 3. The sweep control signal A is shown at the top portion of the diagram. The period of the sweep may, for example, be 100 milliseconds. The transmitter pulse control signals B control the transmitter so that it generates radio frequency bursts 23 indicated at T. The signal received by the antenna 17 is shown by $R_T$ and $R_{TAG}$. $R_T$ is the received direct signal 23 and its decaying clutter signal 24. The received signal from the tag $R_{TAG}$ is a decaying resonant signal 26. It commences shortly after the associated tag is radiated and decays when the transmitted burst terminates. The switched amplifier 18 is switched on by a signal C and is switched on after termination of the burst 23 and preferably also after termination of the clutter signal 24. Thus, the switched amplifier 18 passes primarily the signal emitted by a resonant tag circuit. The second switched amplifier 19 is turned on by the signal pulse D which is narrower than the pulse C whereby the switched amplifier 19 is turned on only after the switched amplifier 18 is stable; that is, the amplifier signal builds up. The amplifier 19 is turned off before the amplifier 18 is turned off to eliminate any decaying or ringing signals in the amplifier. This assures that only signals emitted by the resonant circuit are transmitted by the amplifier 19 to the mixer 21. Referring more particularly to FIG. 3, it is seen that the switching signal C is a modulated signal whereby to provide a signal frequency which differs from the transmitted burst frequency. As will be described, this permits discrimination against direct transmitted signals. The delay line 22 delays the transmitted pulses applied to the mixer 21 a predetermined time so that they arrive at the time the gated or switched received $T_{TAG}$ arrives from the amplifier 19. The output of the mixer is shown at F. It is to be observed that the output of F is a low frequency modulated signal. The output of bandpass amplifier 25 is shown at G and comprises a signal of lower frequency than the transmitted burst frequency. This signal is only present when a corresponding tag circuit is resonant and may last 100 cycles for each resonating circuit.

Figure 4:
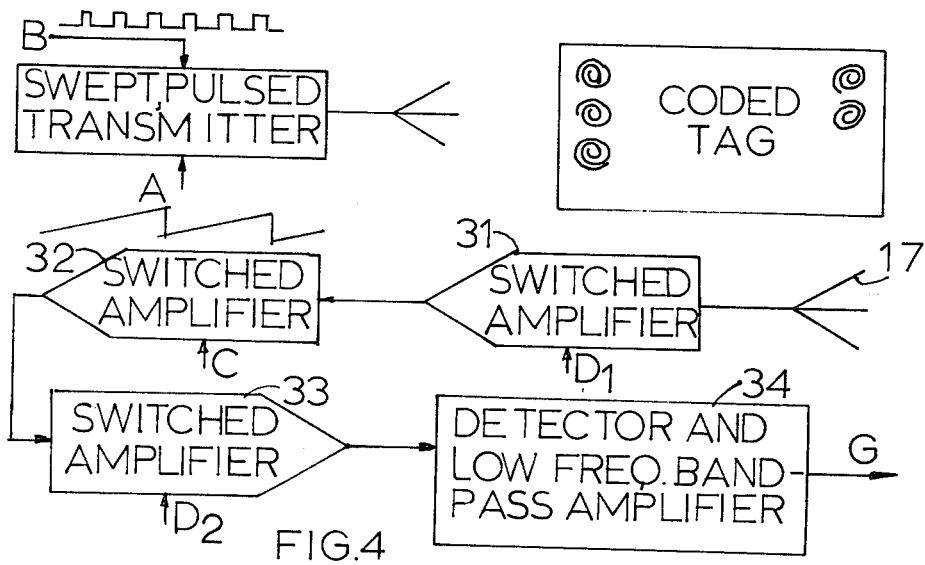
FIG. 4 is a block diagram of another system in accordance with the invention.
Figure 5:
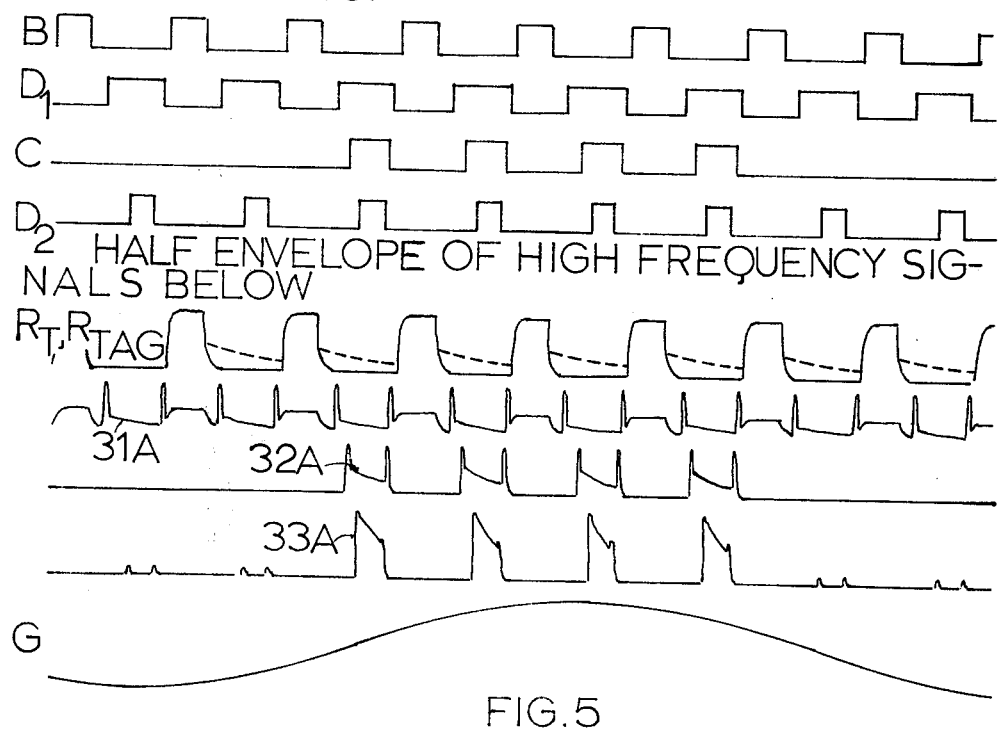
FIG. 5 shows timing diagrams useful in understanding the operation of the system in FIG. 4.

The embodiment shown in FIG. 4 eliminates the delay line and mixer. The signal received by the receiving antenna 17 is applied to a first switched amplifier 31 controlled by pulses $D_1$, FIG. 5. The output of the amplifier 31 is applied to amplifier 32 which is switched by the modulating signal C. The pulses C are timed so that they do not pass switching transients from the amplifier 31. The modulated output from amplifier 32 is applied to switched amplifier 33 controlled by pulses $D_2$. The pulses $D_2$ are narrower than pulses $D_1$ and eliminate switching transients. Although this switch may introduce its own switching transients, compared to a signal already amplified in two stages of amplification, they may be disregarded. Furthermore, their fundamental frequency is at the pulse rate of the transmitter and will as such not pass through the low frequency bandpass amplifier and detector 34. In FIG. 5 the output of the amplifier 31 is shown at 31A, the output of the amplifier 32 is shown at 32A, and the output of amplifier 33 is shown at 33A. The output of the detector and low frequency bandpass amplifier 34 is shown at G.

In the circuit of FIG. 4 the high frequency amplifiers may be of the wide band type. However, this will give a low signal to noise ratio and will permit any external signal with a frequency within the bandpass of the wide band amplifier to reach the detector. This can be improved by making the ultra high frequency amplifiers tuned. It is relatively simple to provide a voltage ramp to control the capacitance of voltage controlled capacitors included in tuned ultra-high frequency amplifiers. This ramp may be the same as the one controlling the frequency of the transmitter. Using a low Q on the tuned amplifier permits a rather gross accuracy on the ramp but this will also set limits to the improvement in selectivity and signal to noise ratio.

Figure 6:
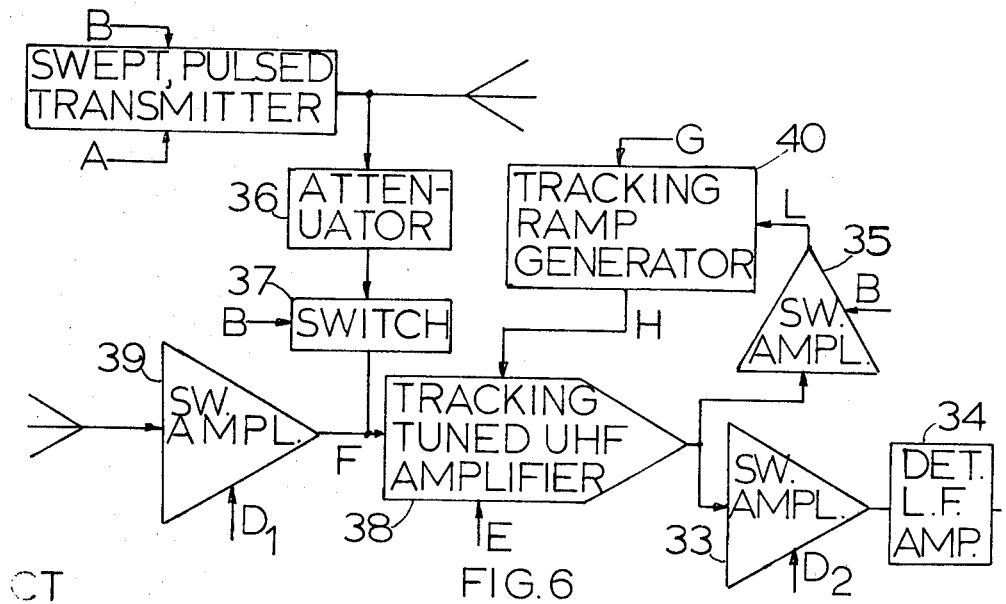
FIG. 6 shows a block diagram of another embodiment of the invention.
Figure 7:
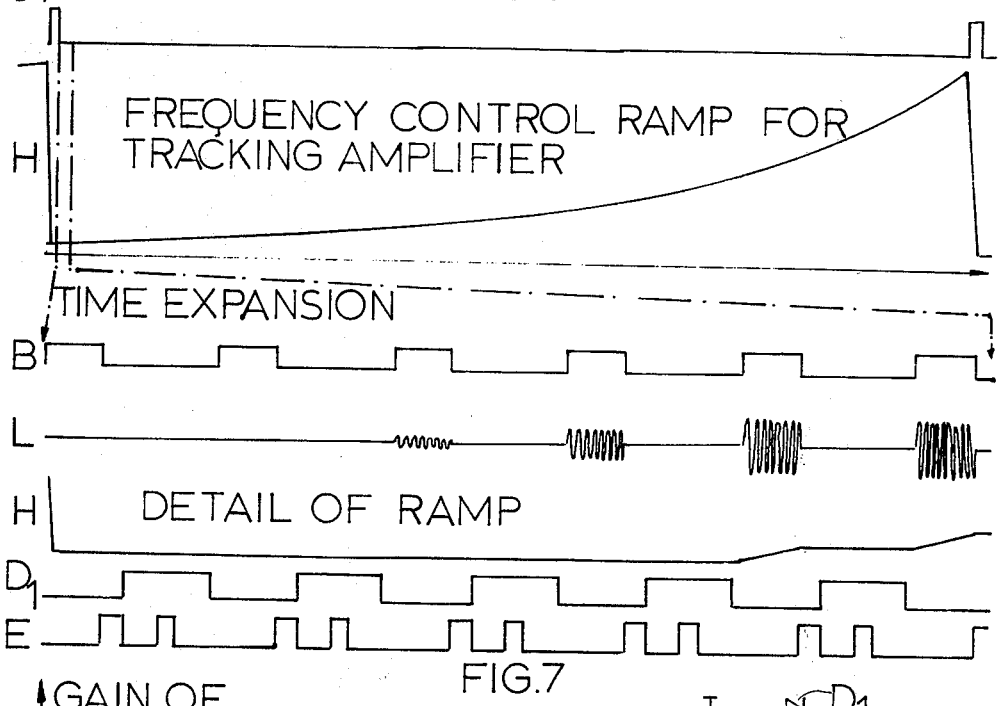
FIG. 7 shows timing diagrams useful in understanding operation of the circuit of FIG. 6.

FIG. 6 describes a system which includes a tracking narrow band ultra-high frequency amplifier to increase the signal to noise ratio and permit rejection of external signals with a frequency within the bandpass of the amplifier and detector. An attenuator 36 is connected to receive transmitted signal and apply the same to switch 37 which is controlled by the pulses B which also control the pulsed transmitter. The output of the switch 37 is applied as an input to a tracking narrow band ultra-high frequency amplifier 38 which is also connected to receive signals from switched amplifier 39 controlled by the switching signal $D_1$, FIG. 7. The output of the amplifier 38 is applied to a switched amplifier 33 controlled by signal $D_2$ as previously described and thence to a detector and low pass amplifier 34. The output of the tracking amplifier is also applied to a switched amplifier 35 and tracking ramp generator 40.

Figure 8:
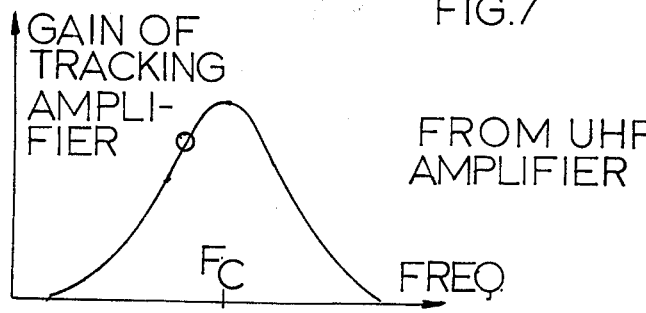
FIG. 8 shows the response of the tracking amplifier of FIG. 6.

The tracking ramp generator 40 generates a ramp for tuning the tuned amplifier 38 so that the center frequency of the bandpass of the amplifier closely follows the transmitted frequency. The basic concept is to let a small portion of the transmitted signal pass to the input of the narrow band amplifier through the attenuator 36 and switch 37. When the output of the amplifier from the constant amplitude frequency swept input signal is close to maximum, a correction is made in the ramp voltage H, FIG. 7. This adjustment or correction adjusts the center frequency of the tracking amplifier in the direction of the transmitter frequency. The ramp voltage H is cleared by pulse CT before the start of each transmitter ramp so that the transmitter frequency will be at a preset center frequency early in the sweep. The amplifier starts tracking when the transmitted frequency reaches close to the top of the bandpass curve of the amplifier as indicated by the circle in FIG. 8. The tracking amplifier which has a high Q would be ringing as a result of the attenuated transmitter signal when the tag signal arrives at its input under control of the signal $D_1$ from the amplifier 39. It is, therefore, necessary to instantly reduce Q of the resonant circuits at the end of transmission and before reception. The signal E is used to connect a low resistance across the tuned circuit in the tracking amplifier in such a way that the value of the tuning capacitor is not changed. Releasing the tuned circuit again at the beginning of the pulse $D_1$ permits the amplifier to start from zero amplitude and build up its shorter amplitude in proportion to the incoming signal. The second hosrter pulse E is to be explained in connection with the description of a special detector which can be used in the detector and amplifier portion 34.

Figure 9:
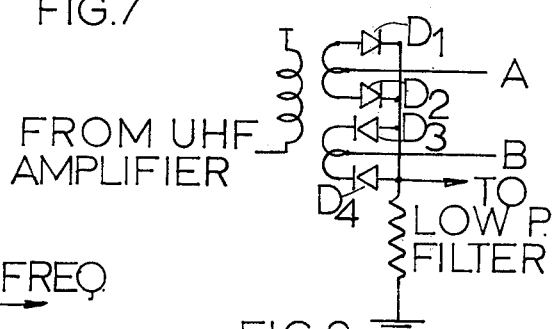
FIG. 9 is a circuit diagram of the detector of FIG. 6.

The fact that the tracking amplifier provides a narrow band reception permits external noise sources such as radio transmitters to show up as signals on the output of the detector low frequency portion of the system only as spikes with short duration. In most cases this will have little or no effect on the subsequent circuits which would integrate the signal with a rather long time constant. There are, however, instances where high radio activity in the sweep band could distort even the integrated output signal. Considering the specific nature of the signal from the ringing resonant circuits in relation to the typical signal from a radio transmitter gives a clue of how to reduce the interference. The signal from the resonant circuits decays exponentially with a time constant that is known, while the signal from a transmitter is essentially constant. Video type transmitters would have amplitude variations or frequency variations during the sampling time but the resulting signal amplitude slope would vary randomly in successive samples giving the same effect as a constant amplitude signal. Cross-correlation with an internally generated exponentially decaying signal gives high preference to the ringing resonant circuit signal and reduces undesired interference. A suitable detector is shown in FIG. 9 and is described in relation to the timing diagrams of FIG. 10. Curves $C_1$ and $C_2$ show the normal detector output from a ringing circuit and from a fixed amplitude disturbance, respectively. Noise will, on the average, have the same character as signal $C_2$ but the slope will deviate randomly. The detector on the output transformer of the ultra-high frequency amplifier is divided into two parts: one for generating positive outputs, and one for generating negative outputs. Two output windings are center tapped and the center points are connected to different pulse generators A and B accurately controlled in amplitude and time. Pulse A is normally negative enough not to permit any incoming signal to forward bias the detector diodes $D_1$ and $D_2$. Likewise, pulse B is normally positive enough not to permit any incoming signal to forward bias diodes $D_3$ and $D_4$. The Q value of the tag circuit is reasonably well known and the time span of the two pulses can be chosen so that the exponential decay of the ringing gives a much higher integrated signal during the first pulse then during the second. This results in a net total integrated signal only slightly smaller than the contribution during the first pulse. If this signal is passed through an integrating network, the integrated sum of the two signals will be present on the output. The assumption here is that pulses A and B are adjusted in amplitude and time so that zero signal will result if no input signal is present in the system. Random noise will certainly have components that will contribute to the output signal but the average noise contribution is in orders of magnitude less than if a straight detector is used. The same result can be achieved by using a regular detector and adding a network that gates signals from the detector during a first pulse time to an integrator and inverts the signal from the detector and gates it during a second pulse time to the same integrator.

The systems described each include a single transmitting and single receiving antenna. Such an arrangement requires that the labels be appropriately oriented. It is possible in certain orientations that the tag or label circuits would receive no energy and, therefore, not transmit any energy to the receiving antenna. Several transmitting and receiving antennas with different orientations eliminate the possibility of tags being oriented so as not to receive energy. Three antennas oriented in three spatially perpendicular directions will always give approximately the same transferred energy to and from a tag circuit regardless of its orientation when located a fixed distance from the antennas.

Referring more particularly to FIG. 11, a swept transmitter 51 has its output applied to a switch 52 which is switched by signal B to form transmitted radio frequency bursts. The signal B is shown also turning on the transmitter 51. This assures sharp, well-defined bursts of energy leaving the switch 52. The bursts are applied to an anetnna switch 53 through an antenna tuning circuit 54. The output of the antenna switch is applied to three perpendicularly oriented antennas 56, 57, and 58 associated with a tag circuit 59. The antenna switch 53 serves to selectively and sequentially energize each of the antennas 56, 57, and 58 as will be described in connection with the timing diagram of FIG. 12. A ramp voltage which can be the ramp voltage A applied to the transmitter and shown as A' serves to concurrently tune the antenna with the change in transmitter frequency. The tuning means may comprise voltage controlled capacitors in the antenna circuit. The antennas 56, 57, and 58 also serve as receiving antennas and provide their signal to switched amplifier 62. The switch control pulses B, the antenna switching signals $A_1$, $A_2$, and $A_3$ and the transmitted bursts $T_1$, $T_2$, and $T_3$ are shown in the timing diagram of FIG. 12.

The modulating signal C controls the pulse generator 61 which generates the pulses R, $R_1$, and $R_2$ applied to the amplifiers 62, 63 and 67, respectively. The $R_{TAG}$ signals which pass through the amplifiers are modulated. Amplifiers 62 and 63 are broadband tracking amplifiers controlled by the ramp signal A. These amplifiers are also switched by pulses R and $R_1$ as shown with the signal R adapted to pass only emitted signals from the resonance circuits with $R_1$ passing a narrower pulse to eliminate any switching transients from the preceding amplifier 62. The output of the amplifier 63 is applied to a narrow band tracking amplifier 64 of the type previously described which is controlled by the tracking ramp generator 66. The output of the narrow band tracking amplifier 64 is applied to another switched amplifier 67 controlled by a narrower pulse $R_2$ to eliminate switching transients.

The output of the switched amplifier 67 is shown as $R_{TAG}$ and comprises in the instance shown a plurality of groups of radio frequency bursts having a basic modulation frequency. These are applied to a detector 68 whose output is applied to a low pass filter 69. The output is then applied to an amplifier 71 for further amplification to a mixer 72 which mixes the output signal with an incoming reference signal derived from signal C and the output of the mixer 72 is applied to a low pass filter 73. The output signal for a scan will be of the nature of that shown in FIG. 13 for a small portion of a scan. The peaks indicate resonant circuits 1, 3, 4, 5, 7, 9 and 10 are present and resonating whereas circuits 2, 6 and 8 are not present giving a tag code of 1, 3, 4, 5, 7, 9 and 10.

Further improvements can be achieved by taking advantage of the fact that in most applications the object to which the tag is attached is in motion in relation to the antennas. Some form of autocorrelation of the system output signals will give a net output signal that is the sum of signals from several sweeps. This serves the double purpose of evening out variations due to nodes in the transmission reception patterns in certain positions and also to increase the signal to noise ratio. FIG. 14 shows the design of an autocorrelation circuit. The output from the previously discussed detection system is applied to an analog-to-digital converter. The number of bits required in the converter depends upon the desired resolution but 8 bits would be sufficient in most applications. With 50 complete cycles induced by a total of 50 resonant circuits on a tag and with 5 samples per cycle, a total of 250 samples per sweep is required. The memory is organized for a capacity of 250 words. The required number of bits per word will be apparent from the following discussion. During the first sweep, the 8 low order bits are fed through the adder to a cleared memory. In the second sweep the new 8 bits in each sampling position are added to the corresponding 8 bits stored in the memory during the previous sweep. A predetermined number of sweeps are made while the object with the tag attached moves past the system. The memory then contains the sum of the sweep signals in digitized form. Depending on the sophistication of the signal processing system, this data may be handled different ways. The data may be used directly in its digitized form in a computer, or it may be converted to analog form through the use of a digit-to-analog converter. FIG. 15 shows a similar system in which the adder is a serial adder.

The systems thus far described have been able to present a good picture of signals from tag circuits. In many instances, however, there may be signals from the surrounds superimposed on the tag signals. The background signals caused by stationary or slowly moving sources can fortunately be eliminated by a simple extention of the averaging process just described. A background signal is detected and stored in a separate memory at a time when no tag signal is present. When a package arrives and a reading is completed, it is stored in another memory. A subtraction cycle is then started and the content in one memory is subtracted from that of the other on a word per word basis. The difference is fed to the output for further signal processing.

Figure 16:
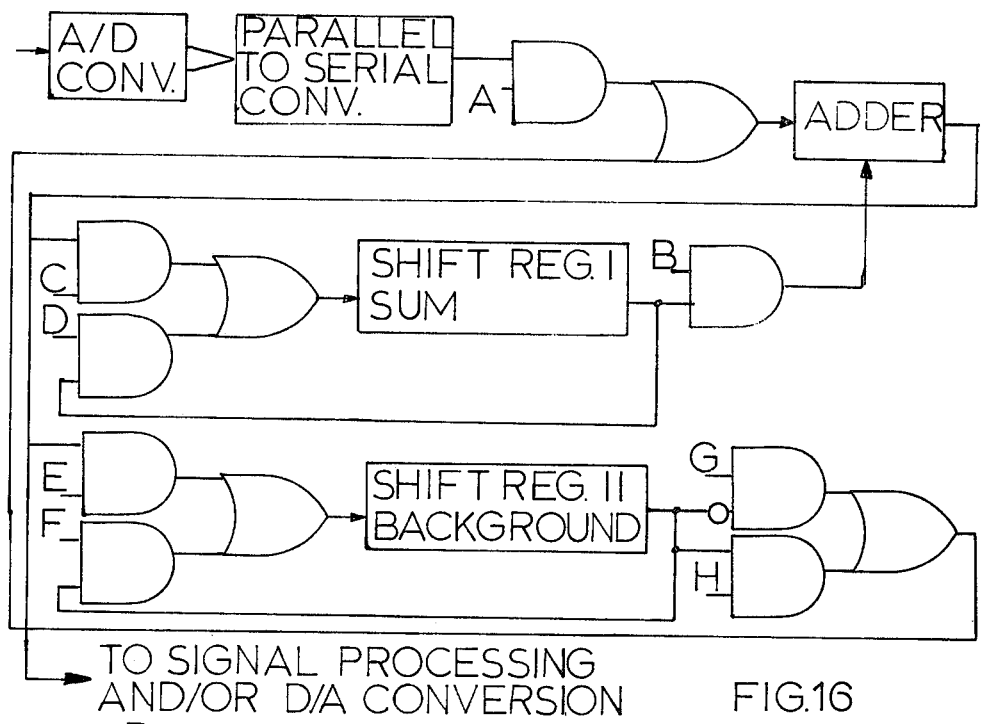
FIG. 16 shows a processing circuit adapted to discriminate against background noise and reflections.

FIG. 16 is a schematic block diagram of a system which can be used for autocorrelation and elimination of background signal. Background signal is averaged in shift register 1 when gate control inputs A, C and B are enabled. The content of shift register 1 is transferred to shift register 2 when B and E are enabled. The tag signals are averaged and stored in shift register 1 when A, B and C are enabled. The background of shift register 2 is subtracted from the signal in shift register 1 and the difference is stored in shift register 1 when B, G, C and F are enabled. The subtraction may be performed by providing complements as indicated by the inverting circle on the gate controlled by G.

Reference is now made to the preferable resonant circuits for use in connection with the system of the present invention. The physical requirements of the resonant circuits according to the present invention differ from the requirements of circuits used in systems where absorption of energy directly from the transmitted field is detected during the actual transmission. In all cases where the energy absorption must be maximum, the circuits are as close to perfect antennas as possible, thus presenting a resistive load to the field. This type of circuit is tightly coupled to the electromagnetic field and does not ring after removal of the transmitted signal. This type of circuit also has some strict restrictions on physical dimensions. The dimensions must be a ¼, ½ or one wavelength at the desired frequency. The operating frequency must, therefore, for such systems be very high to permit small sizes. A one-quarter wavelength circuit at 100 MHz would be 3 inches long, a most impractical dimension for label applications.

Figure 17:
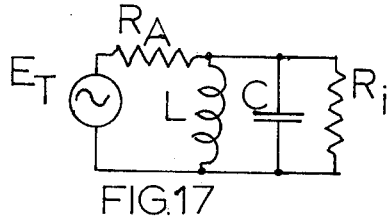
FIG. 17 is a schematic diagram of a resonant circuit in accordance with the invention.

In accordance with the present invention, the tag circuit requirements differ. A circuit ringing with a high Q is basically an LC resonant circuit with small resistive losses. The resistive components are dielectric losses in the dielectric material used in the tag and resistive losses in the conductors and also resistive components associated with coupling to the electromagnetic field. The ideal tag circuit has no internal losses so that the Q value would be determined solely by coupling to the field (the antenna component). A high Q permits a long delay in the reading thereby permitting undesired signal with low equivalent Q to decay to a level below that of the ringing tag or resonant circuit. FIG. 17 is a representation of the equivalent circuit for a resonant circuit. L and C are the tuning elements; $R_i$ is the internal circuit losses in their equivalent parallel form; and $R_A$ is the antenna impedance in equivalent parallel form. The generator represents the external field which feeds energy into the circuit and which, after transmission, acts as a short circuit. Maximum energy would be transferred into the circuit if $R_A$ were zero but this also results in Q = 0. If $R_A = R_i$, the amplitude across the LC circuit of $E_T/2$ and the stored energy in the circuit after transmission would be ¼ that of what would have been the case for $R_A = 0$. If $R_i$ alone had given the circuit a Q of 100, addition of $R_A = R_i$ reduces the Q value to 50. The amplitude of the ringing after 50 cycles would be $E_T/2e$ and the current to the field is $E_T/R_i \times \frac{1}{2}e$.

Figure 18:
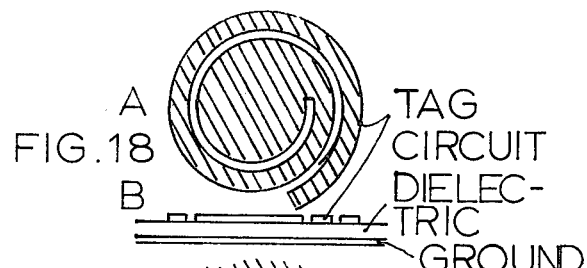
FIG. 18 shows a resonant circuit useful in connection with the present invention.
Figure 19:
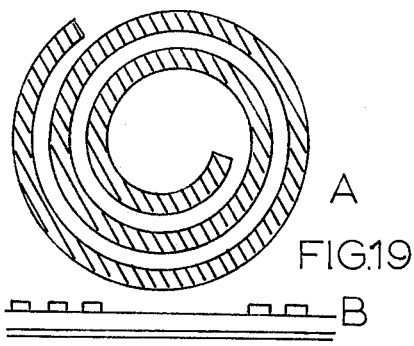
FIG. 19 shows another resonant circuit.
Figure 20:
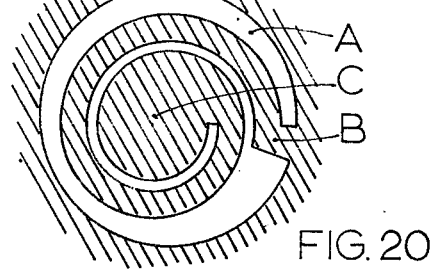
FIG. 20 shows still a further resonant circuit.

A calculation comparing the current to the field 50 cycles after transmission for different values of $R_A$ shows that $R_A = \frac{1}{2} R_i$ gives about twice as much current to the field as does $R_A = R_i$. After 100 cycles the current contribution to the field is about the same for both values and at even higher cycles, the higher $R_A$ values are preferred. Circuits of the general type shown in FIGS. 18A–18B and 19A–19B have been used successfully. The darker areas represent metal or other conductive material remaining on the surface of a dielectric material after etching or printing. The resonant circuit is composed of the inductance in the spiral and the capacitance between successive turns, and between turns and the ground plane on the opposite surface of the dielectric when such ground plane is used or between the central area as shown in FIG. 18 and the ground plane. A circuit with a ground plane of the shape shown in FIG. 19 has a relatively strong coupling to the magnetic field perpendicular to the surface, while a circuit with a ground plane close to the spiral must rely more on the electrostatic field and the plane. A ground plane is required in many applications to make the resonant frequency of the tag circuit insensitive to the material properties of the surface on which the tag is attached. The circuits shown in FIG. 20 placed a short distance from the ground plane permits the magnetic field induced by the current in the spiral to form a closed loop through the center, through the dielectric between the circuit and the ground plane and through the opening A in the figure and back to the center in the space above the circuit. This feature is important in that it reduces the cross-talk between neighboring circuits that without a return to area A would act as a return path for the magnetic field. The circuit in FIG. 20 also forms the embryo of an antenna between points B and C and thereby provides reasonable electrostatic coupling to the field. How small the circuit can be made and still be detected depends upon a number of factors. The power from the transmitter beamed to the tag surface is proportional to the transmitter power and the antenna gain in the direction of the tag. The power per unit area in essentially constant. The ideal circuit would be able to absorb all this energy and have internal circuit parameters such that a high Q could still be achieved. The power transmitted from the tag circuits after transmission is proportional to the received power and declines slower if the Q is high as discussed above. The distance between the circuit and the antennas has a strong influence on the return energy in open space as the return energy in open space is proportional to $1/R^4$ where R is the distance between the antenna and the circuit. This relation applies not only in the far field but also in the near field. Any form of enclosure preventing the transmitted energy to escape improves the return signal significantly. A completely shielded system not only provides maximum return signals from the tag but also prevents external interference.

Circuits less than ¼ inch across can be detected even if the transmitted power is limited to 100 milliwatts provided that the efficiency of the tag circuits is increased. A tag composed of circuits of this size could have 16 circuits per square inch. The physical location of a circuit with a given frequency is of no importance as the search for a bit is in the frequency spectrum rather than in physical space. The only restriction is that of mutual coupling of circuits with close to the same frequency. This can be reduced by physical separation. The bit patterns are distributed over the tags so that maximum frequency separation exists between circuits close to each other. The number of necessary circuits located on a tag depends upon the code used and also on how the tag is produced. If the tags can have the code applied as part of the production process, great savings in the tag area can be achieved. A binary coded decimal digit requires four bits and a tag for n digits must be large enough to hold $4n$ circuits. If, on the other hand, a 2 out of 5 code is used, only half the tag size would be required to hold $2n$ circuits. The 2 out of 5 code also has a built-in check feature. The BCD code would require at least one parity bit per tag for checking purposes. 2 out of 5 code would, in the frequency spectrum, have shorter distances between succeeding bits than a BCD code of the same number of digits. A tag that must be prepared at place of use must have all of the potentially usable bits on the tag. The coding of the tag is then done by disabling circuits that are not to be part of the desired code by punching or cutting, as has been suggested in the prior art.

Figure 21:
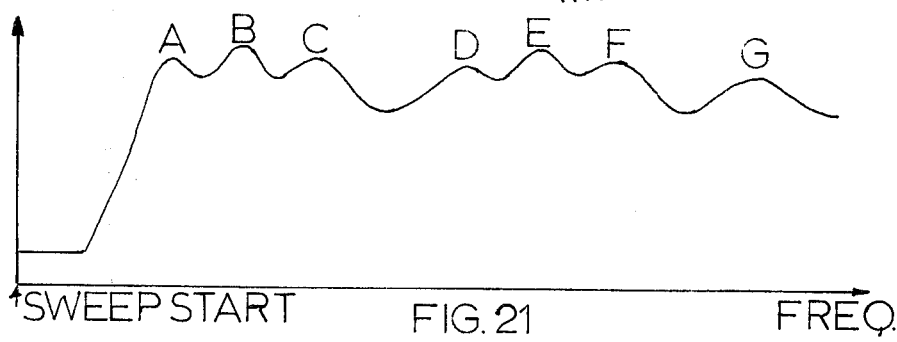
FIG. 21 shows the response of a typical resonant circuit.

There may be a frequency shift due to the production variations which is larger than the frequency separation between successive bits. Production problems can be overcome by a method such as shown in FIG. 21. The sweep starts at a frequency which is lower than the lowest experienced frequency for point A. A special circuit combination provides a leader code consisting of frequencies A, B and C and a following zero always preceding the coded data. A special circuit measures the time between the start of the sweep and the detection of signal A. This gives a first measure of the relative frequency shift. The output from this circuit presets the frequency of a tracking oscillator to closely correspond to the bit separation expected at the measured time delay. The tracking oscillator may be in the form of a phase lock loop integrator circuit. Signal A enables a circuit making the locking range of the phase loop circuit wide enough to permit further adjustment of the oscillator frequency by reading signals B and C.

What is claimed is:

1. A system for determining the presence or absence of a passive electrical circuit which resonates at a predetermined frequency including means for radiating said electrical circuit with periodic bursts of radio frequency energy of predetermined duration having energy at said resonant frequency at a predetermined burst rate to thereby excite the electrical circuit if it is present whereby it radiates energy at said frequency, means for receiving and periodically amplifying at a rate which differs from the burst rate energy at said frequency after termination of said bursts and generating an output signal, and means connected to said receiving means to receive said output signal and provide a signal indicative of the presence or absence of a passive circuit resonant at said frequency.

2. A system as in claim 1 in which said means connected to said receiving means to receive said output signal and provide a signal indicative of the presence or absence of a passive circuit resonant at said frequency comprises a mixer, and means for providing a delayed signal to said mixer from said radiating means for mixing with the output signal.

3. A system as in claim 1 in which said means connected to said receiving means to receive said output signal and provide a signal indicative of the presence or absence of a passive resonant circuit at said frequency includes a detector circuit.

4. A system as in claim 3 in which said detector includes means for discriminating between signals of the shape expected from the resonant circuit and other signals which may be present.

5. A system for determining the presence of one or more passive electrical resonant circuits which resonate at different frequencies including means for radiating said resonant circuits with periodic bursts of radio frequency energy of predetermined duration with successive bursts in each group having a different frequency, means for receiving and amplifying energy at said different frequency after termination of said bursts to provide an output signal, said last means comprising amplifying means adapted to be switched on responsive to a control signal and means for applying a control signal to said amplifying means to switch on said amplifying means after termination of said bursts of radio frequency energy whereby said amplifier provides an output signal when there is a resonating passive circuit at a particular burst frequency, and means connected to receive said output signal and provide a signal indicative of the presence or absence of passive circuits which are resonating at one of said predetermined frequencies.

6. A system as in claim 5 in which said bursts of radio frequency energy are at a predetermined rate and said switching means includes means for periodically switching at a rate which differs from the burst rate whereby to eliminate said predetermined burst rate.

7. A system for determining the presence of one or more passive electrical resonant circuits which resonate at different frequencies including transmitter means responsive to a sweep voltage serving to provide an output having a swept frequency, said transmitter means also being responsive to control pulses of predetermined duration to form output bursts of said duration with successive bursts during a sweep having a different frequency, means for receiving and amplifying energy at said different burst frequency to provide an output signal, said amplifying means being adapted to be switched on responsive to control signals, means for applying control signals to said amplifying means to switch on said amplifying means after termination of each of said bursts of radio frequency whereby said amplifying means provides an output signal when there is a resonating passive circuit at a particular burst frequency, and means connected to receive said output signal and provide a signal indicative of the presence or absence of passive circuits which are resonating at one of said predetermined frequencies.

8. A system as in claim 7 including means for tuning said amplifying means to track the transmitter frequency.

9. A system as in claim 7 including additional amplifying means connected to receive the output of said amplifying means adapted to be switched on responsive to a second control signal, and means for applying said second control signal to said additional amplifying means which turns on the additional amplifying means after the amplifying means is turned on and turns off the additional amplifying means before the amplifying means is turned off to thereby eliminate switching transients.

10. A system as in claim 9 including means for tuning said amplifying means to track the transmitter frequency.

11. A system as in claim 7 in which said means connected to receive said output signal and provide a signal indicative of the presence or absence of a passive circuit resonating at a particular frequency includes a detector circuit for discriminating between signals of the shape expected from the resonant circuit and other signals which may be present.

12. A system for determining the presence of one or more passive electrical resonant circuits which resonate at different frequencies including transmitter means responsive to a sweep voltage serving to provide an output having a swept frequency, said transmitter means also being responsive to control pulses of predetermined duration to form output bursts of said duration with successive bursts during a sweep having a different frequency, means for receiving and amplifying energy at said different burst frequency to provide an output signal, said amplifying means being adapted to be switched on responsive to control signals, means for applying control signals to said amplifying means to switch on said amplifying means after termination of each of said bursts of radio frequency whereby said amplifying means provides an output signal when there is a resonating passive circuit at a particular burst frequency, a mixer connected to receive said output signal, and means providing a delayed signal to said mixer from said transmitter means for mixing with the output signal, said mixer providing an output signal indicative of the presence or absence of passive circuits which are resonating at one of said predetermined frequencies.

13. A system as in claim 7 including three antennas for receiving and directing said bursts of radio frequency energy towards said electrical resonant circuits, said antennas being disposed orthogonally with respect to one another, and means for selectively switching said antennas so that they are sequentially connected to receive successive bursts from said transmitter.

14. A system as in claim 13 including means connected to said antennas for receiving resonant energy received by said antennas from said passive circuits.

15. A system for determining the presence of one or more passive electrical resonant circuits which resonate at different frequencies including transmitter means responsive to a sweep voltage to provide an output having a swept frequency and responsive to control pulses of predetermined duration to form output bursts with successive bursts during a sweep having different frequencies to radiate said resonant circuits, means for receiving and amplifying energy at said different frequencies after termination of said bursts to provide an output signal, and means connected to receive said output signal and provide a signal indicative of the presence or absence of passive circuits which are resonating at one of said predetermined frequencies, said system including autocorrelation circuits adapted to correlate signals from successive sweeps.

16. A system as in claim 15 in which said autocorrelation circuits include means for eliminating background signals.

* * * * *